(No Model.)
J. WHIPPS.
HARROW.
No. 398,480. Patented Feb. 26, 1889.
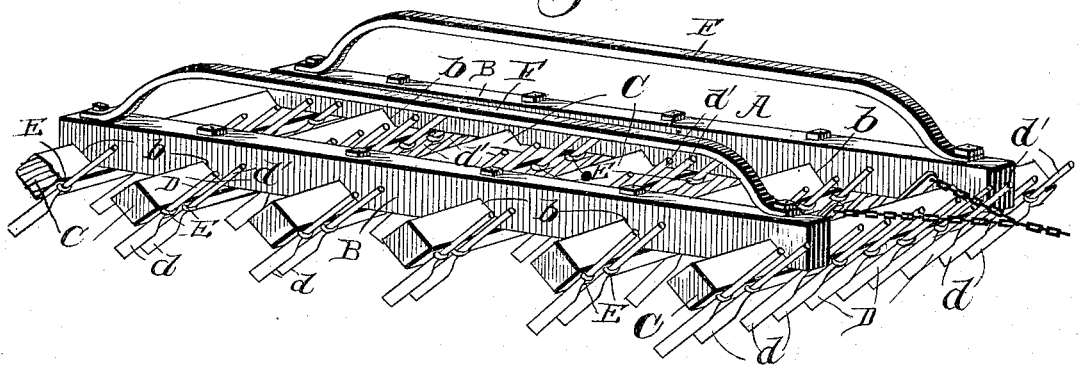
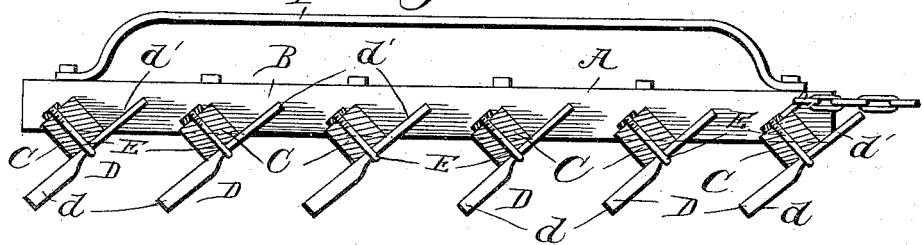
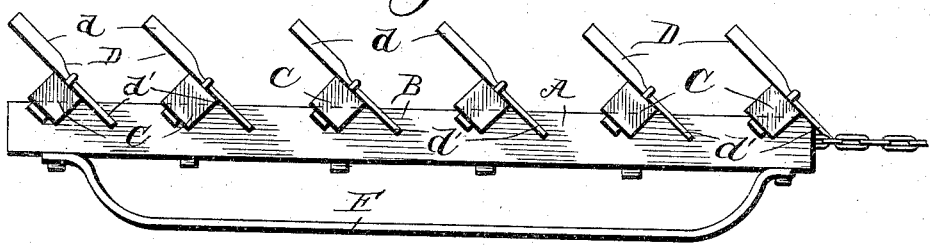
Witnesses.
Henry G. Dieterich
Inventor,
James Whipps,
By his Attorneys

UNITED STATES PATENT OFFICE.

JAMES WHIPPS, OF CARLISLE, INDIANA.

HARROW.

SPECIFICATION forming part of Letters Patent No. 398,480, dated February 26, 1889.

Application filed October 17, 1888. Serial No. 288,325. (No model.)

*To all whom it may concern:*

Be it known that I, JAMES WHIPPS, a citizen of the United States, residing at Carlisle, in the county of Sullivan and State of Indiana, have invented new and useful Improvements in Harrows, of which the following is a specification.

The invention relates to improvements in harrows; and it consists in the construction and novel combination of parts hereinafter described, illustrated in the accompanying drawings, and pointed out in the claim hereto appended.

Figure 1 of the accompanying drawings represents a perspective view of a harrow embodying the invention and having draft-chains attached. Fig. 2 represents a central longitudinal section thereof. Fig. 3 represents a side view of the harrow turned over for conveyance on the runners rising from its side bars.

Referring to the drawings by letter, A designates a harrow-frame consisting of the similar parallel side bars, B, and the transverse bars C, to which the teeth are attached. The side bars have in their lower edges the equidistant angular notches b, into which the transverse bars are fitted and secured. The said notches are preferably rectangular, and the bars C are preferably square in cross-section, with one edge of each inserted in opposite notches in the side bars, so that the lower front sides of said bars C are in parallel planes.

D D are the harrow-teeth, having the blades d and shanks d', which are secured to the lower front sides of the bars C, preferably at equal distances apart, by staples E, secured in said sides, or by other suitable means. The said shanks may be either cylindrical or angular. In the latter case they are fitted into corresponding angular notches in the bars C. The blades d have their edges frontward, and all should penetrate to an equal depth in the soil, those on one transverse bar being about one inch from those on adjacent bars.

F F are longitudinal runners secured at their ends to the upper sides of the side bars, B, near the ends thereof, and rounded at their corners, so that they will not catch upon obstructions on the ground.

The harrow may have a draft pole or tongue attached to its front, but is preferably provided with draft-chains, for a reason hereinafter explained. Besides acting as a harrow, the machine acts also as a leveler or evener and a pulverizer or clod-crusher, the straight parallel lower edges of the bars C leveling the harrowed soil and the lower front sides of said bars crushing the clods.

When it is desired to convey the machine to the field, it is turned over so that it will rest upon the runners and move easily, the harrow-teeth then standing upward. The draft-chains will easily permit this; but if a draft pole or tongue is attached it must be connected in such manner that it can be reversed, else the harrow cannot be turned over.

Having described my invention, I claim—

The improved reversible harrow herein described and shown, comprising the side bars, B, having a series of angular notches in one side, the runners secured to the opposite sides of the side bars, the angular cross-bars secured to the side bars, with their edges fitting in the angular notches therein, the harrow-teeth secured to the lower front sides of the cross-bars, and the draft-chains secured to the front ends of the side bars, as specified.

In testimony that I claim the foregoing as my own I have hereto affixed my signature in presence of two witnesses.

JAMES WHIPPS.

Witnesses:
    F. W. SCHROEDER,
    J. W. LISMAN.